J. F. WREN.
ICE CREAM FREEZER.
APPLICATION FILED AUG. 28, 1918.

1,290,468.

Patented Jan. 7, 1919.
2 SHEETS—SHEET 1.

Witnesses
R. A. Thomas

Inventor
James F. Wren
By Victor J. Evans
Attorney

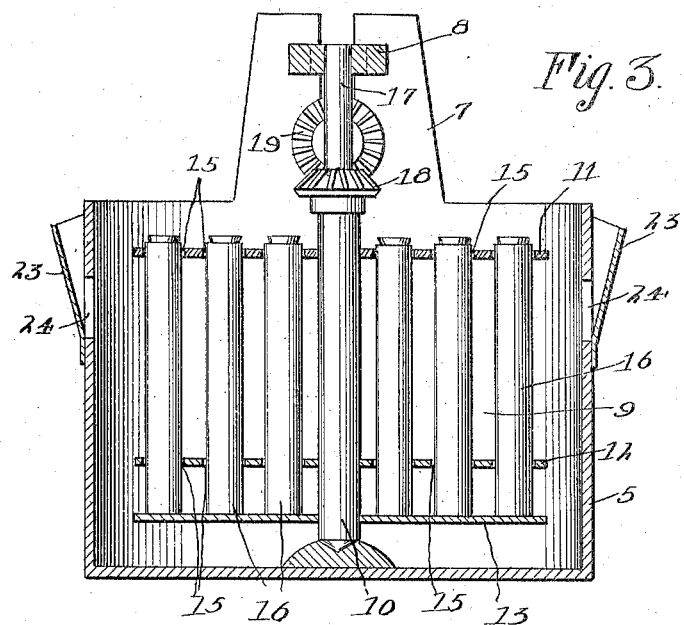
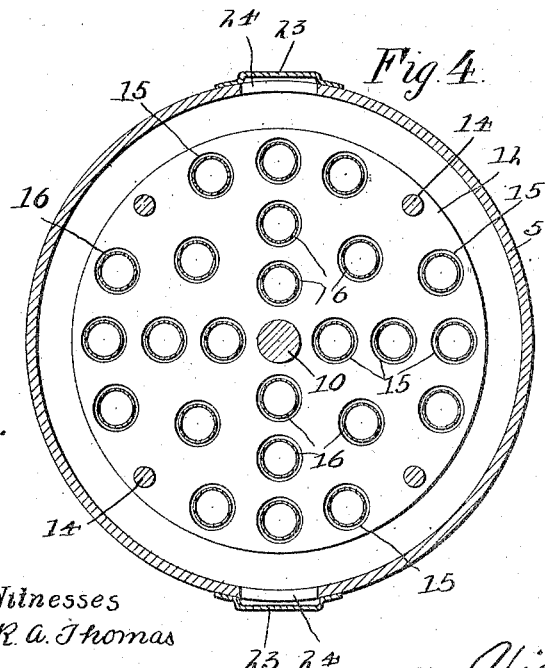
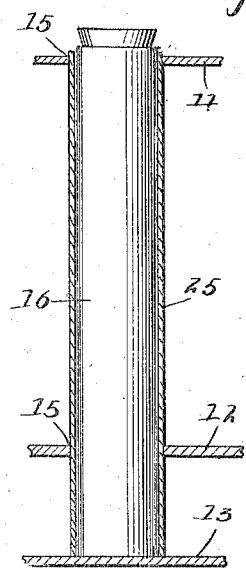

UNITED STATES PATENT OFFICE.

JAMES FRANKLIN WREN, OF LITTLE ROCK, ARKANSAS.

ICE-CREAM FREEZER.

1,290,468.　　　　　Specification of Letters Patent.　　Patented Jan. 7, 1919.

Application filed August 28, 1918. Serial No. 251,832.

*To all whom it may concern:*

Be it known that I, JAMES F. WREN, a citizen of the United States, residing at Little Rock, in the county of Pulaski and State of Arkansas, have invented new and useful Improvements in Ice-Cream Freezers, of which the following is a specification.

This invention relates to ice cream freezers, and has for its object the provision of a device by means of which cream, or any desired mixture disposed within a plurality of separate containers carried by an ice inclosed rotary member may be simultaneously frozen, the particular arrangement of parts enabling ice cream of different flavors to be made at the same time.

An important object is the provision of a device of this character which is so constructed as to avoid the use of paddles or dashers operating within the containers whereby friction will be reduced to the minimum and whereby the rotary member may be turned more and more easily as the freezing progresses.

Another object is the provision of a device of this character in which use is made of a shield member adapted to be positioned in encircling relation to a container preparatory to removing the container so that the ice within the device cannot shift its position and occupy the space previously occupied by a container, upon removal thereof.

An additional object is the provision of a device of this character which will be very simple and inexpensive in manufacture, efficient and durable in use and a general improvement of the art.

With the above and other objects and advantages in view, the invention consists in the details of construction to be hereinafter more fully described and claimed, and illustrated in the accompanying drawing in which:—

Fig. 3 is a central cross sectional view.

Fig. 4 is a horizontal sectional view and

Fig. 5 is a detail sectional view illustrating the use of the shield.

Figure 1:
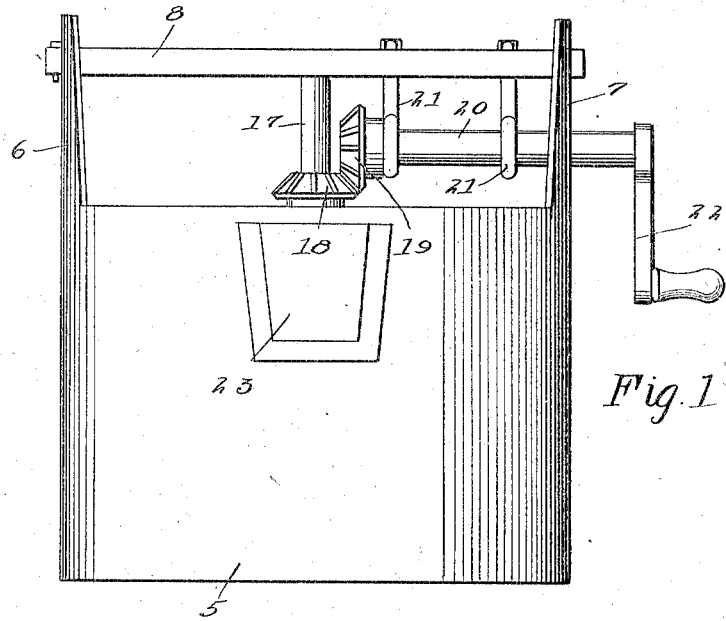
Figure 1 is a side elevation of the device.
Figure 2:
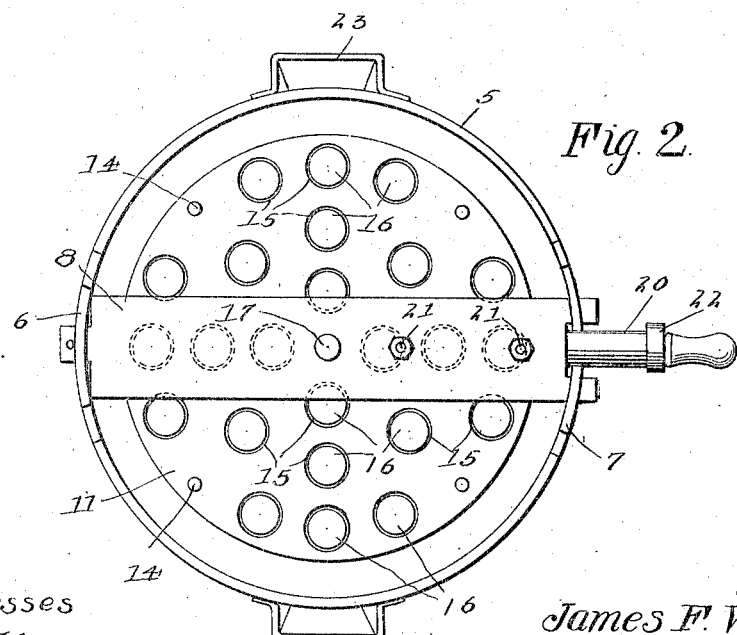
Fig. 2 is a top plan view.

Referring more particularly to the drawings the numeral 5 designates the outer portion of my device which is formed as a suitable tub formed of any desired material and provided at its upper edge at diametrically opposite points with extensions 6 and 7 to which is secured a cross bar 8.

Disposed with the tub 5 is a rotary member designated broadly by the numeral 9 comprising a central standard 10 upon which are secured spaced disks 11, 12 and 13 which are held in properly spaced relation by a plurality of posts 14 disposed at regular intervals. The lowermost disk 13 is formed imperforate while the intermediate disk 12 and upper disks 11 are provided with alined holes 15 within which are disposed the cans or receptacles 16 in which the mixture to be frozen is placed.

In order that the rotary member 9 may be actuated, I provide the upper end of the standard 10 with a reduced cylindrical extension 17 upon which is secured a beveled gear 18 having meshing therewith a similar beveled gear 19 on the end of a horizontally disposed shaft 20 journaled in suitable bearing members 21 in the form of eye bolts depending from the cross bar 8. At its outer end, the shaft 20 is provided with a crank handle 22.

In order that cracked ice may be placed within the tub 5 in a very simple and expeditious manner, I provide upon the tub at diametrically opposite points outwardly and upwardly inclined chute members 23 which communicate with the interior of the tub 5 through openings 24.

In the operation of the device the mixture to be frozen is placed within the cans 16 after which ice is packed around the cans and around the rotary member 9. The ice may be placed directly into the top of the tub or may be inserted through the openings 24 by placing the ice within the chutes 23. It is understood of course that the cans 16 are provided with suitable covers so that the contents may not splash out. After the cans have been filled and the ice placed in position, the operator grasps the crank handle 22 and by means of the shaft 20 and gears 18 and 19 rotates the member 9 carrying the cans 16. It will be apparent that in the natural course of events the material within the cans 16 will become frozen after which the cans may be removed. In order that any desired number of cans may be removed without danger of the ice slipping into the space occupied by the cans, I provide a shield member 25 in the form of a cylindrical sleeve having a diameter slightly greater than the diameter of a can so that the shield may be slid over the can and through the holes 15 in the disks 11 and 12 and onto the disk 13 to form an inclosure entirely surrounding a can. The can may then be removed without danger of the ice slipping into the space previously occupied by it. After a can is thus removed, another can may be inserted in the same place after which the shield member 25 is removed.

From the foregoing description and a study of the drawings it will be apparent that I have thus provided a very simple form of ice cream freezer in which material placed within a plurality of cans may be frozen and in which the use of dashers or paddles is eliminated, the device furthermore having the additional advantage of being more readily turned as the freezing operation progresses in view of the lessening of the friction within the cans as the material solidifies. The device is furthermore extremely sanitary in view of the fact that it is necessary to open only one of the cans while all the others may remain closed and protected from dust or dirt.

While I have shown and described the preferred embodiment of the invention, it will of course be readily understood that I reserve the right to make such changes in the form, construction and arrangement of parts as will not depart from the spirit of the invention nor the scope of the subjoined claims.

Having thus described my invention, I claim:—

A device of the character described comprising a casing adapted to contain cracked ice, a rotary member disposed within said casing and including a plurality of spaced disks, the lowermost disk being imperforate and the intermediate and upper disks being provided with alined holes, cans disposed within said holes and resting upon said imperforate disks, and a cylindrical bottomless sleeve member disposable about either of said cans while said cans are in position, and engageable upon the top of said imperforate disk to provide an inclosure for the can whereby the can may be removed and the space previously occupied thereby be maintained free from the cracked ice.

In testimony whereof I affix my signature.

JAMES FRANKLIN WREN.

Copies of this patent may be obtained for five cents each, by addressing the "Commissioner of Patents, Washington, D. C."